C. H. SIMPSON.
SEED COVERING ATTACHMENT FOR GRAIN DRILLS.
APPLICATION FILED JAN. 16, 1915.
1,174,296.
Patented Mar. 7, 1916.
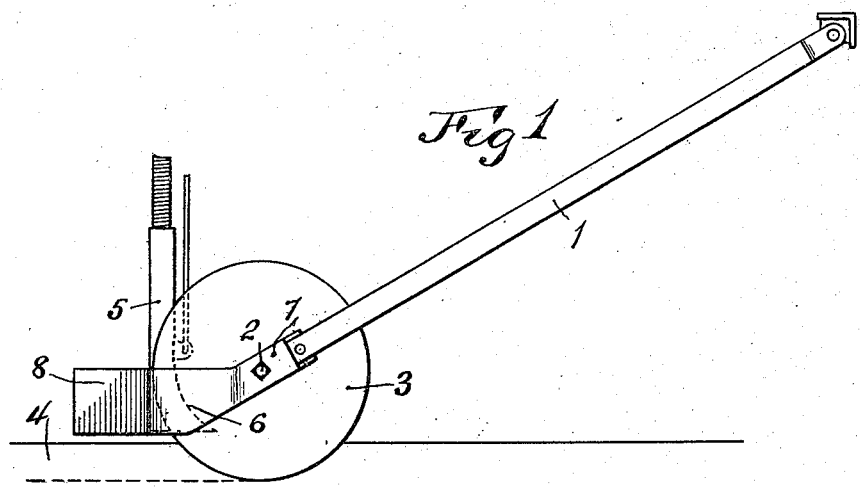
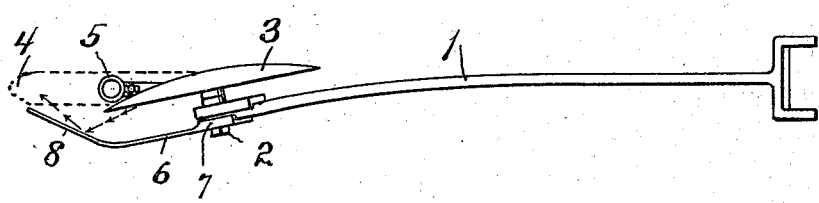
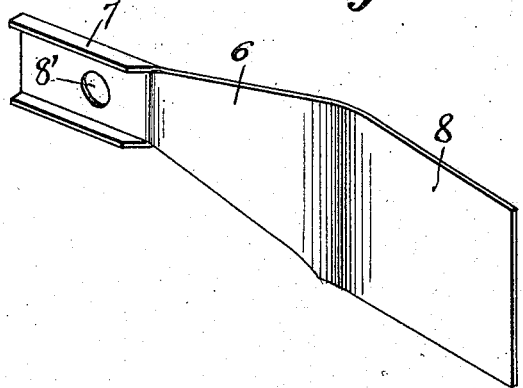
WITNESSES:
INVENTOR.
Charles H. Simpson
BY Warren D. House
His ATTORNEY

UNITED STATES PATENT OFFICE.

CHARLES H. SIMPSON, OF JEWELL, KANSAS.

SEED-COVERING ATTACHMENT FOR GRAIN-DRILLS.

1,174,296.　　　　　Specification of Letters Patent.　　Patented Mar. 7, 1916.

Application filed January 16, 1915. Serial No. 2,574.

*To all whom it may concern:*

Be it known that I, CHARLES H. SIMPSON, a citizen of the United States, residing at Jewell, in the county of Jewell and State of Kansas, have invented a certain new and useful Improvement in Seed-Covering Attachments for Grain-Drills, of which the following is a specification.

My invention relates to improvements in seed covering attachments for grain drills.

It is particularly adapted for use in connection with grain drills, which are provided with rotary disks for making the furrows into which the grain is dropped. With constructions of this character as ordinarily used, the earth which covers the seed in the furrow is dragged into the furrow by means of chains which are drawn behind the disks. Such structures are objectionable for the reason that they do not drag sufficient earth into the furrow and are liable to be broken when the drill is backed up. Furthermore the dragging of the earth upon the ground by the chains increases the draft of the machine.

One of the objects of my invention is to provide means by which the earth, while in flight from the furrow making device, will be deflected into the furrow and upon the seed therein. By deflecting the earth while in flight, that is while it is still in the air and prior to its falling upon the ground, the draft of the machine is lighter and a greater quantity of earth may be cast into the furrow than is the case with structures which employ dragging means for pulling the earth off from the ground into the furrow.

Another object of my invention is to provide a seed covering device which is not adapted to be clogged by weeds, grass or mud, which is simple in construction, may be economically manufactured, which is not liable to breakage or to get out of repair, and which is efficient in operation.

In the accompanying drawing which illustrates the preferred embodiment of my invention, as applied to a grain drill of the rotary disk type, Figure 1 is a side elevation, Fig. 2 is a plan view of what is shown in Fig. 1. Fig. 3 is a perspective view of my improved deflecting blade.

Similar reference characters designate similar parts in the different views.

1 designates the beam of an ordinary grain drill to which is secured by means of a transverse bolt 2 a cup-shaped disk 3, which is rotatable on the bolt 2 and is adapted to make a furrow 4.

5 designates an ordinary seed dropping tube, the lower end of which is disposed adjacent to the convex side of the disk 3 at the rear of and below the axis of the disk and in position such that the seed will be dropped into the furrow 4.

So much of the device as I have just described is of the usual construction. In order to deflect the earth, which is thrown laterally and rearwardly from the disk 3, while in flight and before it settles upon the ground, I provide a deflecting means comprising in the preferred embodiment of my invention a thin steel blade 6 which is provided at its forward end with a channel portion 7 adapted to embrace the rear lower end of the beam 1, and which is provided also with a transverse hole 8' through which extends the bolt 2 upon which the disk 3 is rotatably mounted. The blade 6 extends rearwardly substantially parallel with the plane of the edge of the disk 3 and at the same side of and spaced apart from the concave side of the disk, to a point adjacent to the rear edge of said disk. The disk 6 at its rear end is provided with a portion 8 disposed obliquely to the furrow 4 and also disposed obliquely to the path of movement of the earth as it is thrown laterally and rearwardly from the disk 3. The deflecting blade 6, as shown in Fig. 2 has its lower edge preferably raised a slight distance from the surface of the ground.

In the operation of my invention, as the beam 1 is drawn forwardly in the planting operation, the rotary disk 3 cuts the earth in making the furrow 4 and casts it laterally and rearwardly. The earth while in flight strikes against the oblique portion 8 which deflects the earth into the furrow 4 at the rear of the seed dropping tube 5, thus covering the seed with an ample thickness of earth. As the earth is deflected while in flight and before it has settled on the earth, the draft of the machine is very much reduced from what it would be if the earth were permitted to settle upon the ground and was then dragged or scraped into the furrow. The deflecting blade 6 is self clearing and is not liable to become clogged or fouled with weeds, grass or mud.

I do not limit my invention to the structure shown and described, as modifications, within the scope of the appended claims, may be made without departing from the spirit of my invention.

What I claim is:—

1. In a seed covering attachment for grain drills, a rotary disk adapted to make a furrow, a supporting beam, a deflecting blade having a channel portion in which said beam is fitted and extending rearwardly and obliquely to the path of movement of earth thrown by said disk, and disposed so as to deflect the earth while in flight into the furrow, and a bolt which supports said disk and clamps the blade to the beam.

2. In a seed covering attachment for grain drills, a rotary disk adapted to make a furrow, a supporting beam, a deflecting blade having a channel portion in which said beam is fitted, the blade being carried by the beam wholly clear of the ground and disposed so as to deflect the earth while in flight from the disk into the furrow, and a bolt which supports said disk and clamps the blade to the beam.

In testimony whereof I have signed my name to this specification in presence of two subscribing witnesses.

CHARLES H. SIMPSON.

Witnesses:
WARREN D. HOUSE,
HELEN HOUSE.

Copies of this patent may be obtained for five cents each, by addressing the "Commissioner of Patents, Washington, D. C."